(12) United States Patent
Das et al.

(10) Patent No.: US 10,568,005 B2
(45) Date of Patent: Feb. 18, 2020

(54) METHOD AND SYSTEM FOR X2-MESSAGING IN CLOUD RADIO ACCESS NETWORK (C-RAN)

(71) Applicant: Wipro Limited, Bangalore (IN)

(72) Inventors: Gopinath Das, Balasore (IN); Subhas Chandra Mondal, Bangalore (IN); Shyam Sundar Pal, Kolkata (IN)

(73) Assignee: Wipro Limited, Bangalore (IN)

(*) Notice: Subject to any disclaimer, the term of this patent is extended or adjusted under 35 U.S.C. 154(b) by 199 days.

(21) Appl. No.: 15/937,664

(22) Filed: Mar. 27, 2018

(65) Prior Publication Data

US 2019/0297540 A1 Sep. 26, 2019

(30) Foreign Application Priority Data

Mar. 20, 2018 (IN) .............................. 201841010090

(51) Int. Cl.
*H04W 76/10* (2018.01)
*H04W 76/27* (2018.01)
(Continued)

(52) U.S. Cl.
CPC ... *H04W 36/0055* (2013.01); *H04W 36/0083* (2013.01); *H04W 36/22* (2013.01);
(Continued)

(58) Field of Classification Search
CPC ......... H04W 36/0055; H04W 36/0083; H04W 36/22; H04W 76/10; H04W 76/27; H04W 92/20
See application file for complete search history.

(56) References Cited

U.S. PATENT DOCUMENTS

2016/0135096 A1* 5/2016 Poruri .............. H04W 36/0061
370/331
2017/0013513 A1 1/2017 Agarwal et al.
(Continued)

FOREIGN PATENT DOCUMENTS

WO 2010/006203 A2 1/2010
WO 2014/019777 A1 2/2014

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 8)", Jun. 2012, 215 pages, V8.17.0, 3GPP Organizational Partners.
(Continued)

*Primary Examiner* — Michael Thier
*Assistant Examiner* — Brian P Cox
(74) *Attorney, Agent, or Firm* — Pepper Hamilton LLP

(57) ABSTRACT

This disclosure relates generally to cloud radio access network (C-RAN), and more particularly to X2-messaging in the C-RAN. The method may include receiving, by a control unit in the CRAN, in the C-RAN, a request from a first virtual eNodeB (eNB) associated with a source eNodeB (eNB) to establish a X2 interface with each virtual eNB associated with a set of neighbor eNBs. A second virtual eNB associated with a target eNB may be selected from the virtual eNBs associated with the set of neighbor eNBs. A check may be made to determine whether the first virtual eNB and the second virtual eNB associated with the target eNB are co-located on same datacenter in the C-RAN. At least one X2 message may be transmitted between the first virtual eNB and the second virtual eNB that are co-located on the datacenter based on eNB information accessed from a shared storage.

20 Claims, 8 Drawing Sheets

(51) Int. Cl.
*H04W 36/00* (2009.01)
*H04W 36/22* (2009.01)
*H04W 92/20* (2009.01)

(52) U.S. Cl.
CPC .......... *H04W 76/10* (2018.02); *H04W 76/27* (2018.02); *H04W 92/20* (2013.01)

(56) References Cited

U.S. PATENT DOCUMENTS

2017/0111482 A1  4/2017  Mishra et al.
2018/0035334 A1* 2/2018  Lohar .................... H04W 24/02
2018/0041927 A1* 2/2018  Raval .................... H04W 24/02

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 8)", Mar. 2012, 47 pages, V8.12.0, 3GPP Organizational Partners.
"3rd Generation Partnership Project; Technical Specification Group Radio Access Network; Evolved Universal Terrestrial Radio Access (E-UTRA); Physical channels and modulation (Release 12)", Dec. 2013, 120 pages, V12.0.0, 3GPP Organizational Partners.
"3rd Generation Partnership Project; Technical Specification Group Services and System Aspects; General Packet Radio Service (GPRS) enhancements for Evolved Universal Terrestrial Radio Access Network (E-UTRAN) access Release 8)", Mar. 2008, 171 pages, V8.1.0, 3GPP Organizational Partners.

* cited by examiner

METHOD AND SYSTEM FOR X2-MESSAGING IN CLOUD RADIO ACCESS NETWORK (C-RAN)

This application claims the benefit of Indian Patent Application Serial No. 201841010090, filed Mar. 20, 2018, which is hereby incorporated by reference in its entirety.

FIELD

This disclosure relates generally to X2 interface messaging, and more particularly to X2 interface messaging in a cloud radio access network (CRAN).

BACKGROUND

The Long Term Evolution (LTE) standard defines an interface, called the X2 interface, for assisting communication between eNodeBs (eNBs). Typically, the X2 interface connects neighboring eNBs in a peer-to-peer fashion to perform functions like mobility management (e.g., handovers), load management (e.g., overload condition), reporting of general error situations, and eNB configuration updates. For handling such functions, this interface uses protocol stack that includes Stream Control Transmission Protocol (SCTP)/GPRS tunneling protocol (GTP), internet protocol (IP), and Ethernet to exchange data packets between eNBs.

For instance, a source eNB composes the X2 messages, after which the messages are encoded using Abstract Syntax Notation (ASN.1) compression. The SCTP/IP/Ethernet stack add the corresponding headers to the ASN encoded messages, after which the messages are routed through the physical communication medium (i.e. cables, switch and other intermediate nodes etc.). Upon receiving the ASN encoded messages, a target eNB may decode the corresponding header of SCTP/IP/Ethernet stack and then perform ASN1 decompression to obtain the actual X2 message. The limitation is that the X2 messages routed using the SCTP/IP/Ethernet stack may require complex encoding/decoding chains that results in unnecessary X2 interfacing delay. A given eNB may typically have approximately 20-30 neighboring eNBs at a time, each of which will require a configured X2 route with each of its neighbors, which requires a large and error-prone configuration, and which further consumes a large amount of routing state to be maintained in the network. Additionally, as the number of eNBs in a network tends to fluctuate as networks are extended, reconfigured, and maintained, a huge administrative overhead is thus created for maintaining such static X2 routes.

SUMMARY

In one embodiment, a method of X2-messaging in the cloud radio access network (C-RAN) is disclosed. The method may include receiving, by a control unit in the C-RAN, a request from a first virtual eNodeB (eNB) associated with a source eNB to establish a X2 interface with each virtual eNB associated with a set of neighbor eNBs. A second virtual eNB associated with a target eNB may be selected, by the control unit, from the virtual eNBs associated with the set of neighbor eNBs. A check may then be made by the control unit to determine whether the first virtual eNB associated with the source eNB and the second virtual eNB associated with the target eNB are co-located and/or running on same datacenter in the C-RAN. At least one X2 message may be transmitted, by the control unit, between the first virtual eNB and the second virtual eNB when the first virtual eNB and the second virtual eNB are co-located and/or running on same datacenter. At least one X2 interface function may be performed on at least one of the source eNB or the target eNB based on the at least one X2 message transmitted between the first virtual eNB and the second virtual eNB.

In one embodiment, a C-RAN is disclosed. In one example, the C-RAN may include a plurality of virtual eBs and a control unit communicatively connected to each virtual eNB. The control unit may receive a request from a first virtual eNB associated with a source eNodeB (eNB) to establish a X2 interface with each virtual eNB associated with a set of neighbor eNBs. Further, the control unit may select a second virtual eNB associated with a target eNB from the virtual eNBs associated with the set of neighbor eNBs. Furthermore, the control unit may determine whether a first virtual eNB associated with the source eNB and a second virtual eNB associated with the target eNB are co-located and/or running on same datacenter in the C-RAN. When the first virtual eNB and the second virtual eNB are co-located on the datacenter, at least one X2 message may be transmitted between the first virtual eNB and the second virtual eNB. At least one X2 interface function may be performed on at least one of the source eNB or the target eNB based on the at least one X2 message transmitted between the first virtual eNB and the second virtual eNB.

In one embodiment, a non-transitory computer-readable medium storing computer-executable instructions for managing X2 interface in the C-RAN is disclosed. In one example, the stored instructions, when executed by a processor, may cause the processor to perform operations such as receiving, by a control unit in the C-RAN, a request from a first virtual eNodeB (eNB) associated with a source eNodeB (eNB) to establish a X2 interface with each virtual eNB associated with a set of neighbor eNBs. The operations may further include selecting, by the control unit, a second virtual eNB associated with a target eNB from the virtual eNBs associated with the set of neighbor eNBs. The operations may further include determining, by the control unit, whether the first virtual eNB associated with the source eNB and the second virtual eNB associated with the target eNB are co-located and/or running on same datacenter in the C-RAN. The operations may further include transmitting, by the control unit, at least one X2 message between the first virtual eNB and the second virtual eNB when the first virtual eNB and the second virtual eNB are co-located on the datacenter. The operations may further include instructing at least one of the source eNB or the target eNB to perform at least one X2 interface function based on the at least one X2 message transmitted between the first virtual eNB and the second virtual eNB.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A communication network may include physical eNodeBs (eNBs) to provide radio coverage to a number of user equipment (UE). The term "physical eNodeB" may be substituted with such a terminology as a radio base station, a Node B, an eNodeB (eNB), an access point (AP), Remote Radio Unit (RRU), and Remote Radio Head (RRH). Used herein, a physical eNB may be a source eNB, a target eNB, or a neighbor eNB. The term "source eNB" may refer to a serving eNB which takes the responsibility for making handover decision or load management decision and maintains the connection of UE to the network. The term "neighbor eNB" may refer to each of the physical eNBs accessible to the UE. For handover function, the target eNB may refer to a physical eNB chosen from the list of neighbor eNBs, and may serve as a new serving eNB for the UE after handover. For load management function, the target eNB may refer to a physical eNB chosen from the list of neighbor eNBs, to handle traffic load of the source eNB.

Typically, to perform handover or load management, a direct X2 interface i.e., a Stream Control Transmission Protocol (SCTP) connection may be established between two physical eNodeBs, (e.g., a source eNB and a target eNB). Through the X2 interface, a large amount of eNodeB configuration transfer messages may need to be exchanged simultaneously between the physical eNBs and may therefore produce overload in real time. Further, the X2 messages routed using the SCTP/IP/Ethernet stack may require complex encoding/decoding chains that results in unnecessary X2 interfacing delay. Exemplary embodiments illustrate a centralized, cooperative, or cloud radio access network (C-RAN) re-architecture, in which X2 message processing at the physical eNB can be moved to the virtual eNBs. Thereby, avoiding latencies and scalability issues in establishing the X2 connections between the physical eNBs. Several examples are provided showing C-RAN architectures that can be used to manage X2 interfacing between the virtual eNBs.

Figure 1:
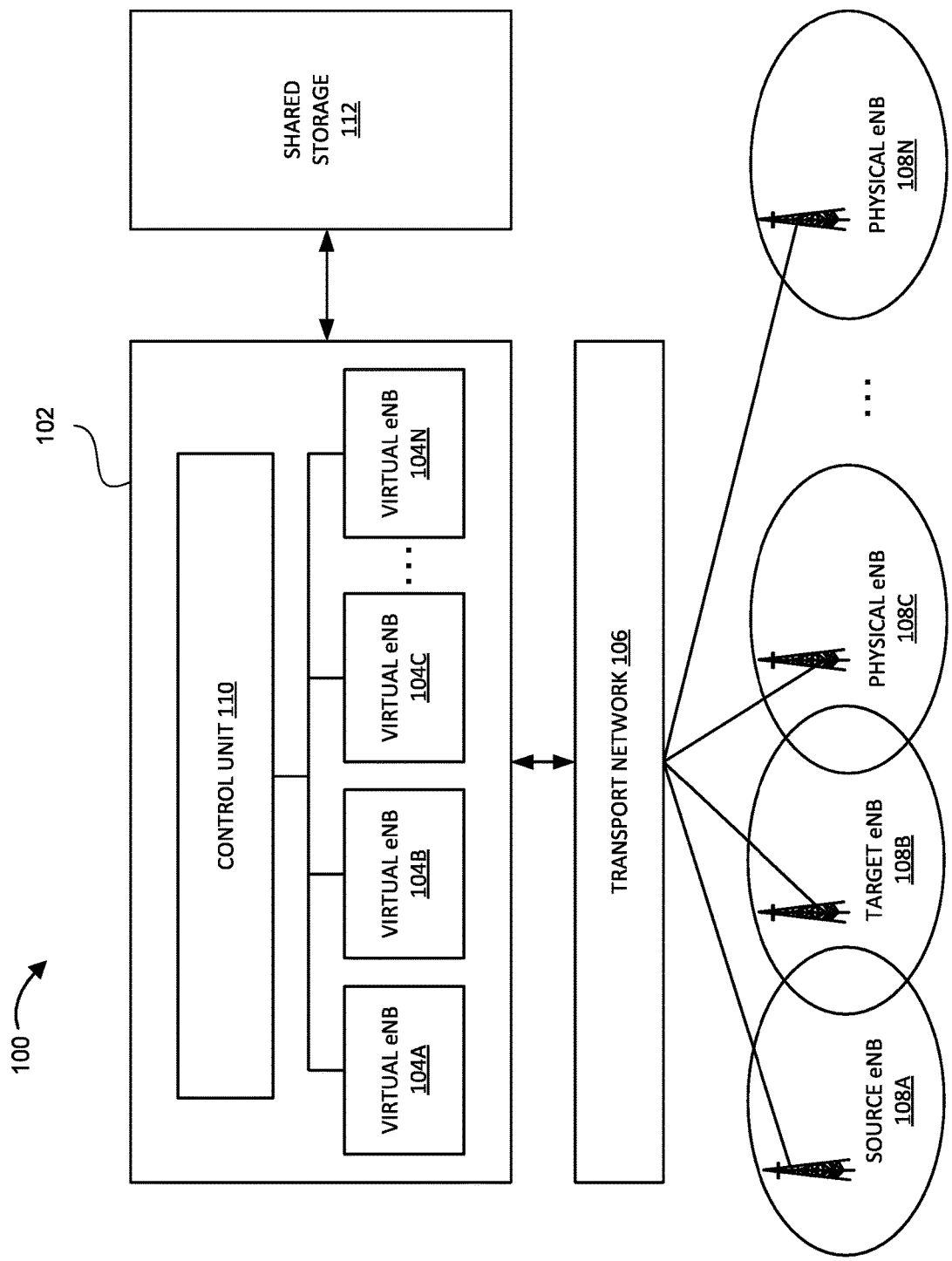
FIG. 1 is a functional block diagram of a system for managing X2-messaging in a centralized/cloud radio access network (C-RAN) according to an exemplary embodiment of the present disclosure.

An exemplary C-RAN 100 in which various embodiments of the invention may function is illustrated in FIG. 1. The C-RAN 100 may include a datacenter 102 (i.e., a host system) for running a plurality of virtual eNBs 104A-N. Further, the C-RAN 100 may include a control unit 106 communicatively connected to each virtual eNB 104A-N. For example, the control unit 106 can be a part of management software residing in the datacenter 102. One skilled in the art can appreciate that control unit 106 can also be provided in a software application that can run on the datacenter 102.

In the C-RAN 100, the functionality of the base transceiver station (or eNodeB) can be subdivided between virtual eNBs 104A-N and physical eNBs 108A-N. For example, the virtual eNBs 104A-N can provide the radio functions of the digital baseband domain, and the physical eNBs 108A-N can provide the analog radio frequency functions. The virtual eNBs 104A-N and the physical eNBs 108A-N can communicate with each other via a physical transport network 110, such as an optical transport network. A Common Public Radio Interface (CPRI) can be used to define an interface between the virtual eNBs 104A-N and the physical eNBs 108A-N.

Each virtual eNB 104A-N and the control unit 106 may be in communication with a shared storage 112 to store the configuration data associated with the physical eNBs 108A-N. For instance, each virtual eNB 104A-N may obtain eNB information (i.e., current configuration of each physical eNB), and Neighbor Base Station (NBS) list information from the management application of a corresponding physical eNB 108A-N. Example configuration data for the physical eNBs 108A-N may include, but is not limited to eNB transmission power, eNB cell identifier (ID), location of a eNB, and number of sectors in coverage area of a eNB. Further, the configuration data for each physical eNB 108A-N may include, but is not limited to antenna information, channel quality indicator (CQI)-report configuration, logical channel configuration, media access control (MAC)-Main configuration, Packet Data Convergence Protocol (PDCP)-configuration, and the like.

In another example, each virtual eNB 104A-N may have individual local disk caches to store configuration data associated with the corresponding physical eNB 108A-N. Each of the virtual eNB (e.g., 104A) can access disk caches associated with other virtual eNBs (e.g., 104B-N). More specifically, the virtual eNB 104A can communicate with the virtual eNB 104B, and through this communication the virtual eNB 104A has access to configuration data of a physical eNB 108B associated with the virtual eNB 104B. In the similar way, the virtual eNB 104B has access to configuration data of a physical eNB 108A associated with the virtual eNB 104A.

During operation, the control unit 106 may receive a request from a first virtual eNB 104A associated with a source eNB 108A to establish a X2 interface with each virtual eNB (e.g., 104B-C) associated with a set of neighbor eNBs (e.g., 108B-C). The request from the first virtual eNB 104A may be to perform the handover coordination and/or load management with one of the set of neighbor eNBs (e.g., 108B-C) associated with the first virtual eNB 104A.

Upon receiving the request from the first virtual eNB 104A, the control unit 106 may select a second virtual eNB 104B associated with a target eNB 108B from the virtual eNBs 104B-C associated with the set of neighbor eNBs 108B-C. For selecting the second virtual eNB 104B, the control unit 106 may determine whether the request is to perform a handover coordination or load management associated with the first virtual eNB 104A. Based on the determination, the control unit 106 may obtain information associated with UE capacity and Radio Resource Control (RRC) connections of the first virtual eNB 104A and each virtual eNB 104B-C associated with the set of neighbor eNBs 108B-C. The second virtual eNB 104B may be selected from the virtual eNBs 104B-C associated with the set of neighbor eNBs 108B-C by analyzing the UE capacity and the RRC connections of each virtual eNB based on a predefined criteria. Example predefined criteria may be a measure associated with the reserved resource of each physical eNB 108A-N to serve the UE. In an example, the physical eNB 108B connected to the second virtual eNB 104B may be selected as the target eNB, which possess a higher-order reserved resources compared to the neighbor eNB 108C. Example reserved resource of each physical eNB 108A-N may include frequency domain resource, time domain resource, and Long Term Evolution (LTE) physical resource block.

In order to enable X2-messaging, the control unit 106 may determine whether the first virtual eNB 104A associated with the source eNB 108A and the second virtual eNB 104B associated with the target eNB 108B are co-located and/or running on the datacenter 102. The term "co-located" may refer to a condition in which a multiple instances of the virtual eNBs are running in a same host-computer (i.e., datacenter 102). When the first virtual eNB 104A and the second virtual eNB 104B are co-located on the same datacenter 102 (i.e., in the single host), the at least one X2 message may be transmitted between the first virtual eNB 104A and the second virtual eNB 104B. The interfacing of two virtual eNBs 104A-B co-located and/or running on a single host may refer to Co-located X2 (CoX2) interfacing. Such CoX2 interface may use the inter-process communication (IPC) mechanism for transmitting the X2 messages (i.e., control plane messages and user plane messages) between the virtual eNBs 104A and 104B. Example IPC mechanism may include but not limited to shared memory, named-pipe, memory-mapped file, and message queue.

In one example, the control plane messages may include X2 Application Protocol (X2-AP) messages and user plane messages may include General Packet Radio Service (GPRS) Tunneling Protocol (GTP) messages. The X2-AP messages may be transmitted between the first virtual eNB 104A and the second virtual eNB 104B using the IPC stack, to perform load management and/or handover coordination at the source eNB 108A and the target eNB 108B. Further, using the IPC stack, the GTP messages may be transmitted from the first virtual eNB 104A to the second virtual eNB 104B to forward UE downlink data buffered at the source eNB 108A to the target eNB 108C. The CoX2 interfacing between the virtual eNBs 104A and 104B is explained in detail in FIG. 2 of this specification.

Figure 2:
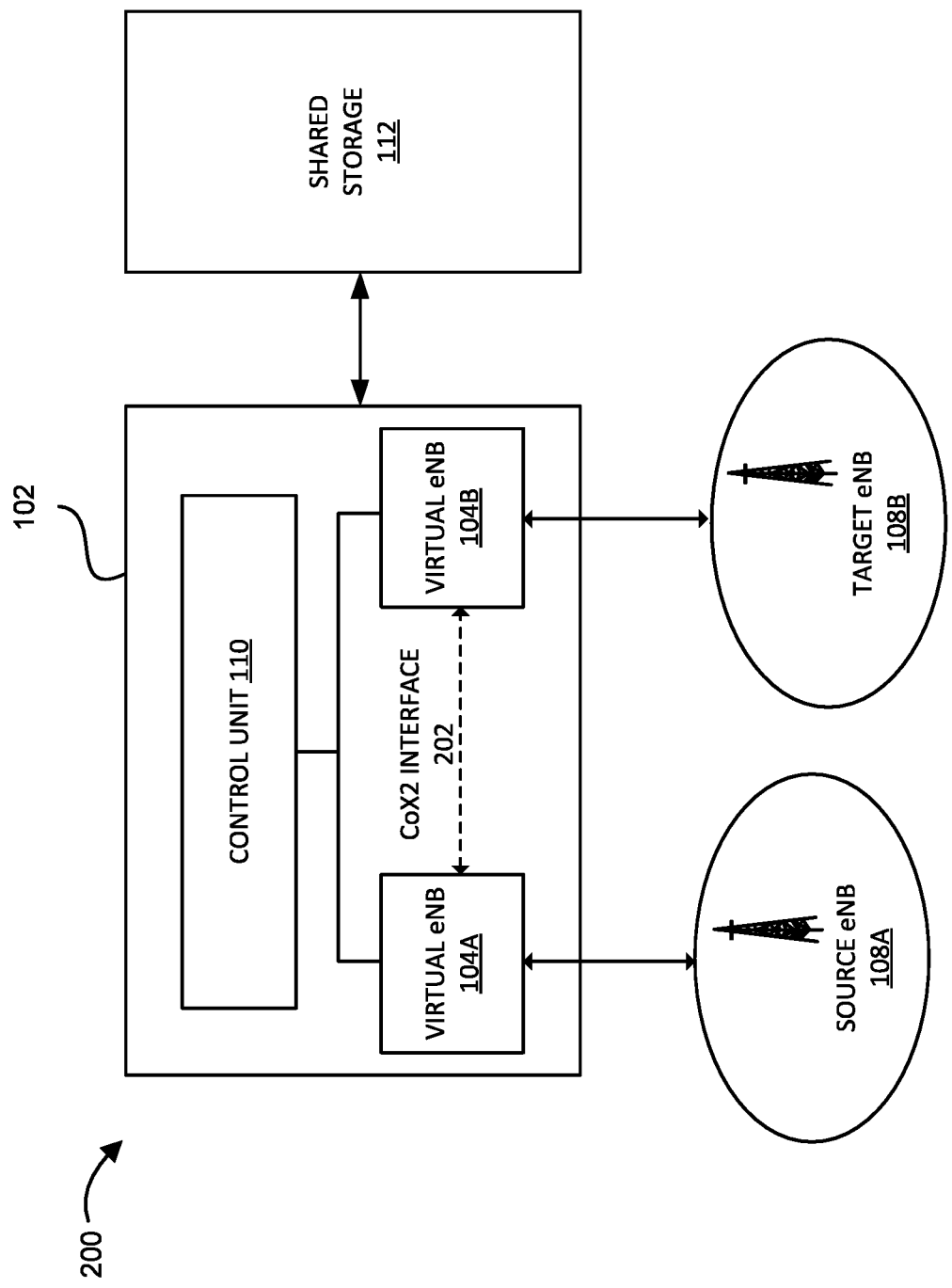
FIG. 2 is a functional block diagram illustrating X2-messaging between virtual eNBs in the C-RAN according to an exemplary embodiment of the present disclosure.
Figure 3A:
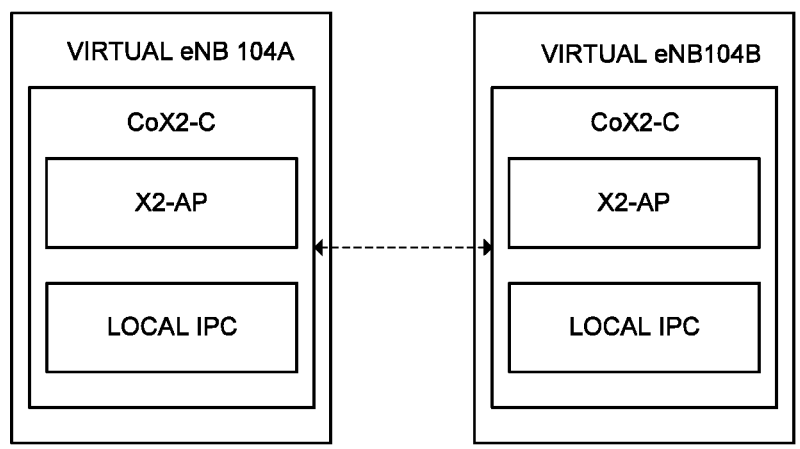
FIGS. 3A-3D are protocol stacks of proposed CoX2 interface between the virtual eNBs and conventional X2 interface between the physical eNBs.
Figure 3B:
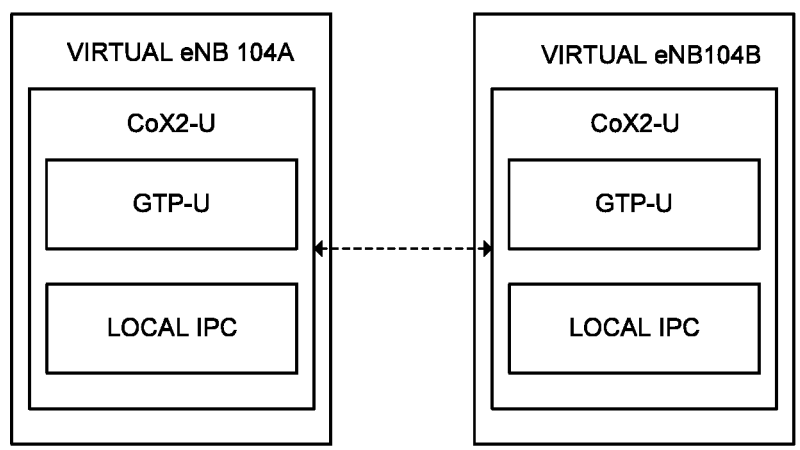
Figure 3C:
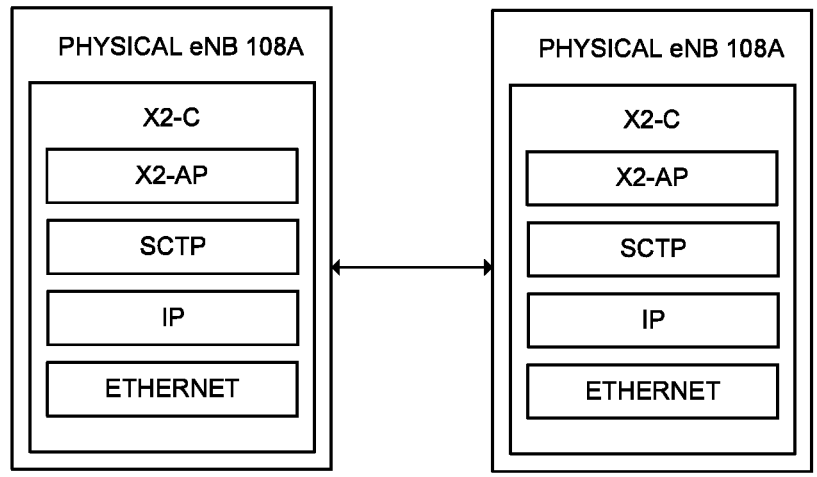
Figure 3D:
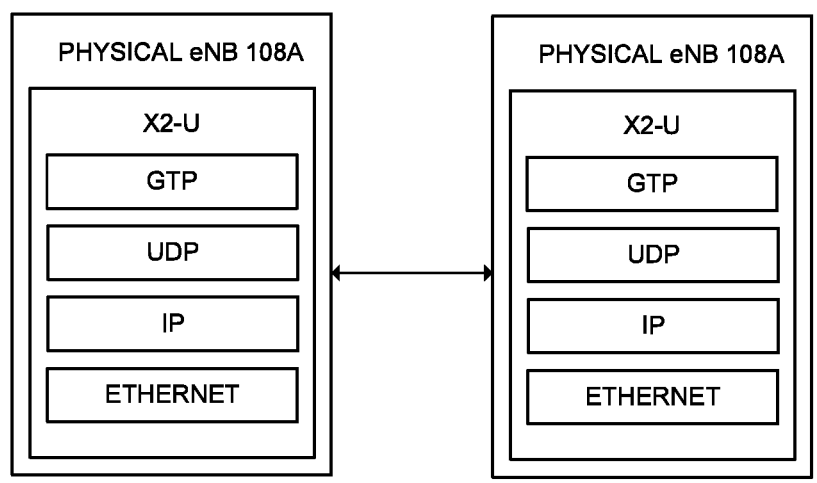

FIG. 2 illustrates a C-RAN system 100 for managing CoX2 interface 202 between virtual eNBs 104A and 104B using IPC stack, during handover scenario. As shown, virtual eNB 104A performs at least a portion of base station functioning of a source eNB 108A that is currently serving a UE. The virtual eNB 104B may perform base station processing associated with the target eNB 108B, which will serve as a new serving eNB after handover. During handover, when the first virtual eNB 104A request to establish an interface with the second virtual eNB 104B, the control unit 106 may determine that the virtual eNB 104A and virtual eNB 104B are co-located on the single host computing system 102. Upon confirming that the virtual eNBs 104A and 104B are co-located eNBs, the control unit 106 allows the virtual eNBs 104A and 104B to establish CoX2 interface 202 with each other.

After establishing the CoX2 interface between the virtual eNBs 104A and 104B, the first virtual eNB 104A may transmit a handover request to the second virtual eNB 104B. In one example, during the handover, the first virtual eNB 104A may receive the UE downlink (UE-DL) data buffered at the source eNB 108A and then store the UE-DL data in the shared storage (112 as in FIG. 1). In response to the received request, the second virtual eNB 104B may instruct the target eNB 108B to reserve resources for performing handover. Further, the second virtual eNB 104B may transmit the handover acknowledgement to the first virtual eNB 104A based on the measure of reserved resource associated with the target eNB 108B to serve the UE.

On receiving the handover acknowledgement, the first virtual eNB 104A may instruct the source eNB 108A to provide a handover command to the UE so as to reconfigure the connection settings in the UE corresponding to the target eNB 108B. Meanwhile, the second virtual eNB 104B may communicate the buffered UE-DL data accessed from the shared storage to the target eNB 108B. Once the UE connected to the target eNB 108B (i.e., new serving physical eNB after handover), the target eNB 108B may provide the buffered UE-DL data to the UE. As mentioned above, the part of handover co-ordination, such as, X2-messaging which include "Handover Request", "Handover Request Ack", "Handover Command" and the like may be performed between the co-located virtual eNBs 104A and 104B in the C-RAN 100.

In another embodiment, CoX2 interface 202 may be established between virtual eNBs 104A and 104B using IPC stack, during load management scenario. The control unit 106 may receive a load balancing request from the first virtual eNB 104A when the source eNB 108A associated with the first virtual eNB 104B is in overload condition. Used herein, the "overload condition" may refer to a condition in which a route between the source eNB 108A and at least one of UE and a network device (such as router, gateway and the like) becomes sub-optimal to handle the data traffic.

On receiving the load management request from the first virtual eNB 104A, the control unit 106 may obtain information associated with UE capacity and RRC connections of the first virtual eNB 104A and the set of neighbor virtual eNBs (104B-C as in FIG. 1). By analyzing the UE capacity and the RRC connections of each virtual eNB 104A-C, the control unit 106 may select the second virtual eNB 104B from the set of neighbor eNBs. Further, the control unit may make a decision to exchange overload and traffic load information between the first virtual eNB 104A and the second virtual eNB 104B. Accordingly, the X2-messages (i.e., the traffic load associated with the source eNB 108A) may be tunneled from the first virtual eNB 104A to the second virtual eNB 104B using the CoX2 interface 202, for performing the load management between the source eNB 108A and the target eNB 108B. The CoX2 interface 202 may use the IPC stack for transmitting the X2-messages, which is explained in detail in conjunction with FIG. 3.

FIG. 3 depicts the protocol stacks 300A and 300B of proposed CoX2 interface. If virtual eNB 104A is running on same host as the virtual eNB 104B, the CoX2 interface may use IPC protocol stacks 300A and 300B for the control plane (CoX2-C) and user plane (GTP-U), respectively. The IPC protocol stacks 300A and 300B may provide the support needed for virtual eNBs 104A-B in a host system (i.e., 102 as in FIG. 1) to communicate with each other. Example stack detail for existing CoX2 interface is:

CoX2-C: X2-AP/local IPC
  C0X2-U: GTP-U/local IPC

Peer communication latency on control plane to exchange (i.e., transmit/receive) the X2AP message between the virtual eNBs 104A-B may include time required for performing local IPC at transmitter-side eNB (Co-X2AP Latency)$^{TX}$ and at receiver-side eNB (Co-X2AP Latency)$^{RX}$. Thus, the peer X2AP layer communication latency is given by:

$$\text{X2AP-C latency}=(\text{Co-X2AP Latency})^{TX}+(\text{Co-X2AP Latency})^{RX}$$

Where, (Co-X2AP Latency)$^{TX}$ and (Co-X2AP Latency)$^{RX}$ are the aggregate time required for performing IPC between the virtual eNBs 104A-B (i.e., local IPC time is negligible).

Similarly, peer communication latency on user plane to tunnel the buffered user traffic from the virtual eNB 104A to the virtual eNB 104B may include time required for performing local IPC at transmitter-side eNB (GTP-U Latency)$^{TX}$ and at receiver-side eNB (GTP-U Latency)$^{RX}$. Thus, the peer GTP layer communication latency is given by:

$$\text{GTP-U latency}=(\text{GTP-U Latency})^{TX}+(\text{GTP-U Latency})^{RX}$$

Where, (GTP-U Latency)$^{TX}$ and (GTP-U Latency)$^{RX}$ are the aggregate time required for performing IPC between the virtual eNBs (i.e., local IPC time is negligible).

In contrast, the existing (i.e., conventional) X2 interface may use a SCTP/IP/Ethernet protocol stacks 300C and 300D. For instance, a physical eNB 108A composes the X2 messages, after which are encoded using Abstract syntax notation (ASN.1) compression. The SCTP/IP/Ethernet stack add the corresponding headers to the ASN encoded messages, after which are routed through the physical communication medium (i.e. cables, switch and other intermediate nodes etc.). Upon receiving the ASN encoded messages, a physical eNB 108B decode the corresponding header of SCTP/IP/Ethernet stack and then perform ASN1 decompression to obtain the actual X2 message. Same approach is followed for the user plan packet processing. Example stack detail for existing X2 interface is:

X2-C: X2AP/ASN1/SCTP/IP/Ethernet/Phy communication.
  X2-U: GTPU/UDP/IP/Ethernet/Phy communication.

Peer communication latency on control plane to exchange (i.e., transmit/receive) the X2AP-C message between the physical eNBs may include time required for performing encoding at transmitter-side eNB (X2AP Latency)$^{TX}$, time required for performing decoding at receiver-side eNB (X2AP Latency)$^{RX}$ along with communication delay in physical medium (Latency)$^{PHY.MED}$. The X2 interface uses SCTP as the transport layer protocol for transmitting the control plane messages (i.e., X2AP-C). Thus, the peer X2AP layer communication latency is given by:

$$\text{X2AP-C latency}=(\text{X2AP Latency})^{TX}+(\text{Latency})^{PHY.MED}+(\text{X2AP Latency})^{RX}$$

Where, (X2AP-C Latency)$^{TX}$=X2AP (encoding time)+ASN1 (encoding time)+
  SCTP(encoding time)+IP (encoding time)+ETH (encoding time); and
(X2AP-C Latency)$^{RX}$=ETH (decoding time)+IP (decoding time)+SCTP(decoding time)+ASN1 (decoding time)+X2AP(decoding time).

Similarly, peer communication latency on user plane to tunnel the buffered user traffic from the physical eNB 108A to the physical eNB 108B may include time required for performing encoding at transmitter-side eNB (GTP Latency)$^{TX}$, time required for performing decoding at receiver-side eNB (GTP Latency) along with communication delay in physical medium (Latency)$^{PHY}$ MED. Use of SCTP enables delivery of control plane information between the physical eNBs, while for tunneling the user plane messages (i.e., GTP), the User Datagram Protocol (UDP) is used as the transport layer protocol. Thus, the peer GTP layer communication latency is given by:

$$\text{GTP latency}=(\text{GTP Latency})^{TX}+(\text{Latency})^{PHY.MED}+(\text{GTP Latency})^{RX}$$

Where, (GTP Latency)$^{TX}$=GTP (encoding time)+UDP (encoding time)+IP(encoding time)+ETH (encoding time); and
  (GTP Latency)$^{RX}$=ETH (decoding time)+IP (decoding time)+UDP(decoding time)+GTP (decoding time).

Thus, the main drawbacks of the existing SCTP/IP/Ethernet protocol stack are the requirement of complex encoding/decoding chains that results in unnecessary X2 interfacing delay. For instance, the time range for performing the SCTP/IP/Ethernet layer processing may be in a range of hundreds of microseconds to milliseconds depending on physical mediums. Thus, the SCTP/IP/Ethernet layer processing is a very time consuming process and may affect the fast communication between the physical eNBs. From the comparative study of communication delay and layer processing in existing X2 interface and proposed CoX2 interface, as the virtual eNBs are running on same host, ASN1 compression and encoding/decoding of X2AP and/or GTP may be alleviated by carefully selecting the local IPC. As the local IPC time is negligible, use of IPC stack in CoX2 interface may enable the X2AP message and GTP-U communication in a fast and reliable manner. Further, the decision to select a target eNB 108B for handover or load management may be performed at the C-RAN, without requiring a peer-to-peer communication link from a source eNB 108A to each of its neighbor eNB 108B-C, thus greatly reducing the network overhead.

In particular, as will be appreciated by those of ordinary skill in the art, control unit and shared storage for performing the techniques and steps described herein may be implemented in the host computing system that is running virtual eNBs, either by hardware, software, or combinations of hardware and software. For example, suitable code may be accessed and executed by the one or more processors on the host computing system to perform some or all of the techniques described herein. Similarly application specific integrated circuits (ASICs) configured to perform some or all of the processes described herein may be included in the one or more processors on the host computing system.

Figure 4:
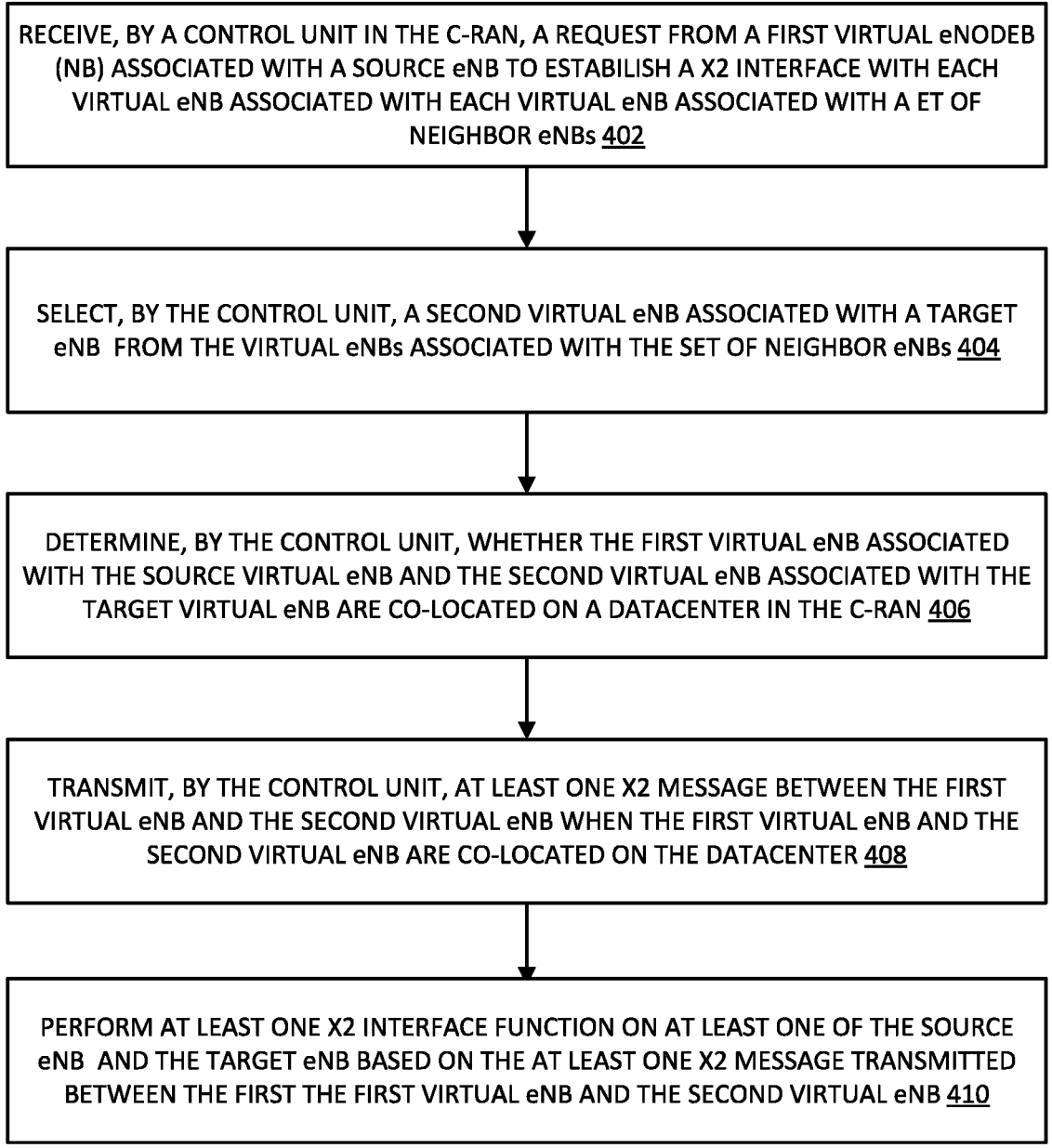
FIG. 4 is a flow diagram illustrating a method of X2-messaging in a C-RAN, in accordance with an exemplary embodiment of the present disclosure.

Referring now to FIG. 4, a flow diagram illustrating a method of managing X2-messaging between virtual eNBs on a CRAN in accordance with some embodiments of the current disclosure is disclosed. As illustrated in FIG. 4, at step 402, a request from a first virtual eNodeB (eNB) associated with a source eNodeB (eNB) may be received, by a control unit in the C-RAN, to establish a X2 interface with each virtual eNB associated with a set of neighbor eNBs. At step 404, a second virtual eNB associated with a target eNB may be selected, by the control unit, from the virtual eNBs associated with the set of neighbor eNBs. In one example, the UE capacity and RRC capacity with each virtual eNB associated with the neighbor eNBs may be analyzed to select the second virtual eNB.

At step 406, a check may be made by the control unit to determine whether the first virtual eNB associated with the source eNB and the second virtual eNB associated with the target eNB are co-located on a datacenter (i.e., in a same host computer) in the C-RAN. At step 408, at least one X2 message may be transmitted, by the control unit, between the first virtual eNB and the second virtual eNB based on eNB information accessed from a shared storage when the first virtual eNB and the second virtual eNB are co-located on the datacenter. At step 410, at least one X2 interface function may be performed on at least one of the source eNB or the target eNB based on the at least one X2 message transmitted between the first virtual eNB and the second virtual eNB. Example X2 interface function may include at least one of handover coordination or load management between the source eNB and the target eNB.

Figure 5:
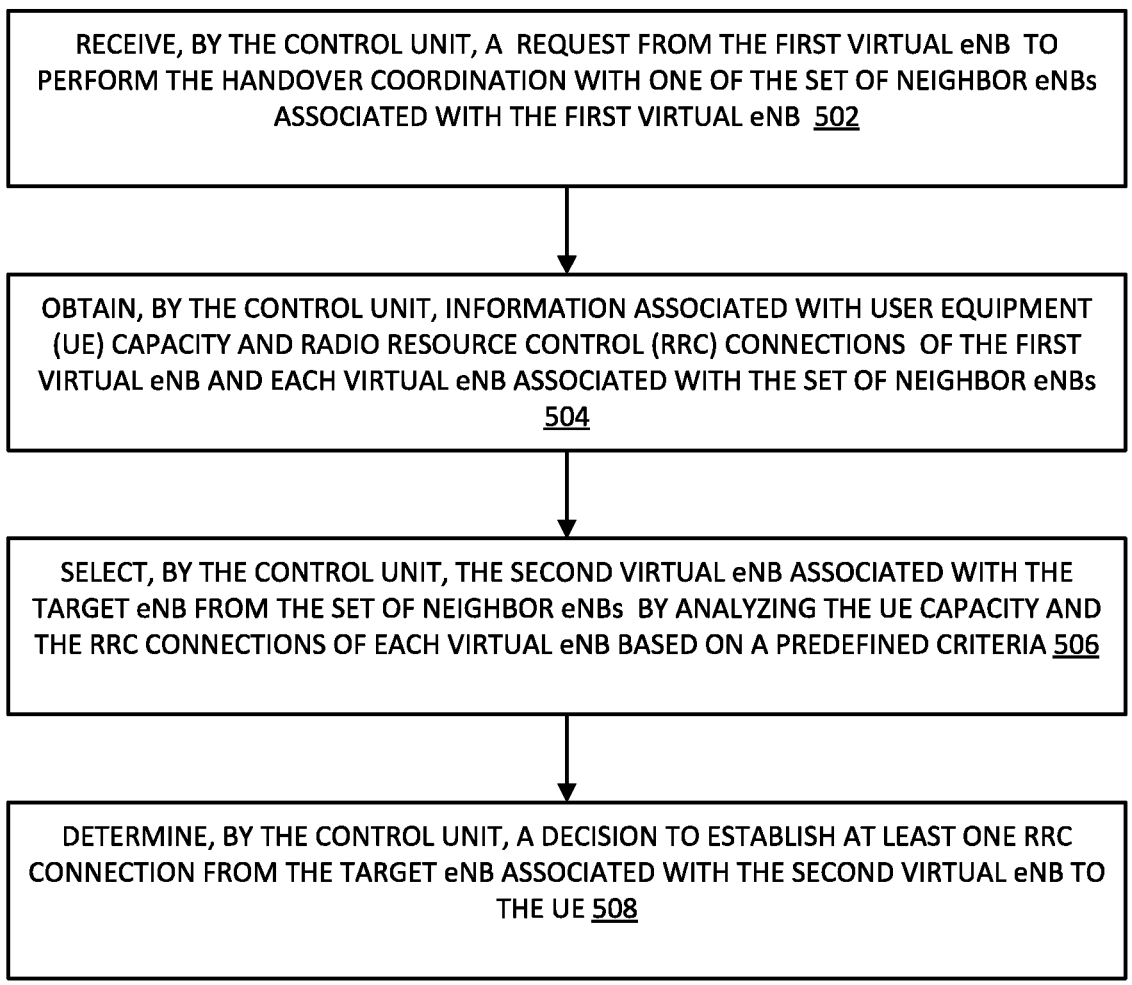
FIG. 5 is a flow diagram illustrating a method of performing handover co-ordination based on X2-messaging in the C-RAN, in accordance with an exemplary embodiment of the present disclosure.

Referring now to FIG. 5, a flow diagram illustrating steps performed at a C-RAN to manage X2-messaging between the virtual eNBs for handover coordination in accordance with some embodiments of the present disclosure is disclosed. As illustrated in the flowchart, at step 502, a request from the first virtual eNB may be received, by the control unit, to perform the handover coordination with one of the set of neighbor eNBs associated with the first virtual eNB. At step 504, information associated with user equipment (UE) capacity and Radio Resource Control (RRC) connections of the first virtual eNB and each virtual eNB associated with the set of neighbor eNBs may be obtained, by the control unit. At step 506, the second virtual eNB associated with the target eNB may be selected from the set of neighbor eNBs by analyzing the UE capacity and the RRC connections of each virtual eNB based on a predefined criteria. At step 508, a decision may be determined by the control unit to establish at least one RRC connection from the target eNB associated with the second virtual eNB to the UE. At step 510, configuration setting associated with the at least one RRC connection to be established from the target eNB to the UE may be retrieved, by the control unit.

Further, the source eNB may be instructed to share the configuration setting associated with the at least one RRC connection to the UE to perform the handover co-ordination. A new RRC connection established from the target eNB to the UE may be updated, in a shared storage. To perform a subsequent handover coordination, a set of neighboring eNBs of the target eNB and configuration settings associated with the set of neighboring eNBs list may be automatically updated.

Figure 6:
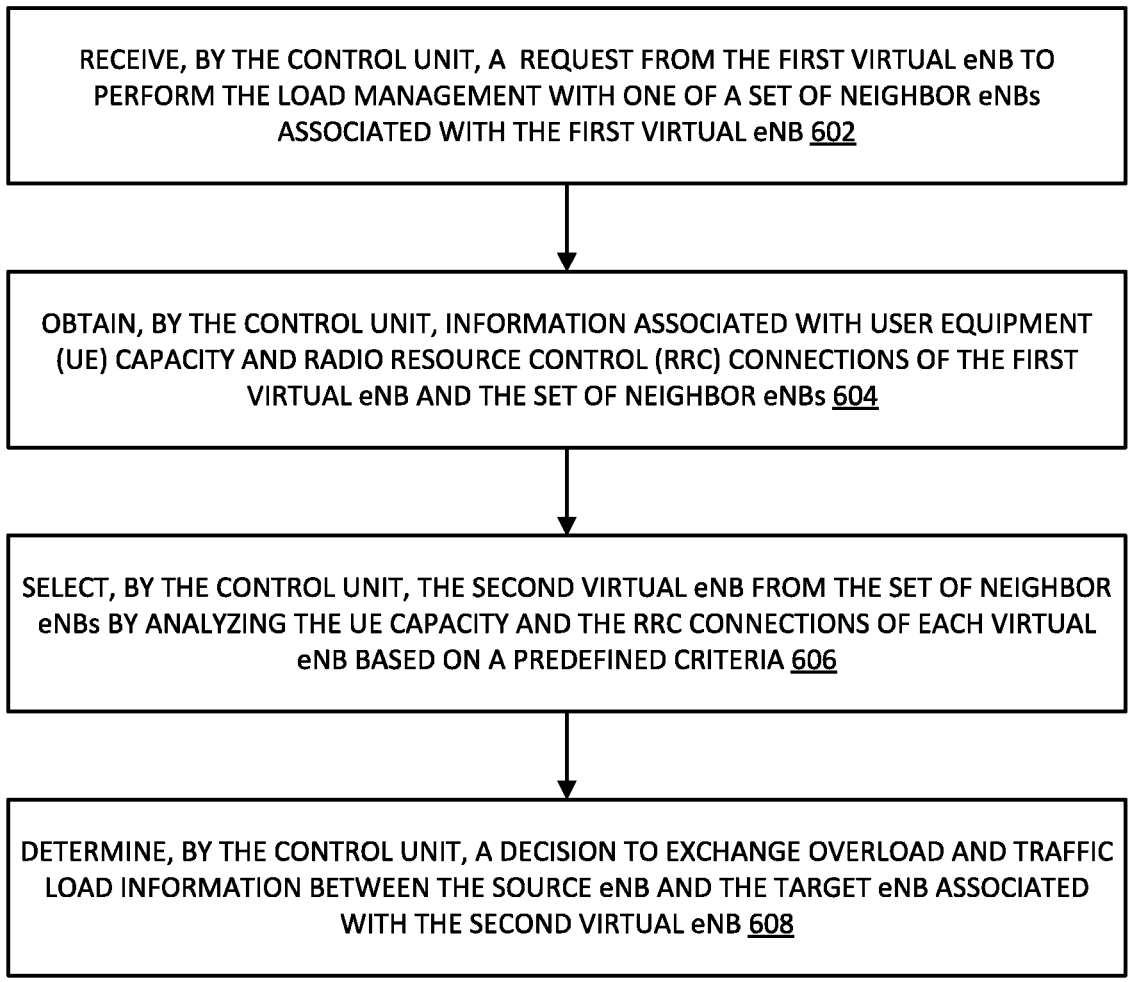
FIG. 6 is a flow diagram illustrating a method of performing load management based on X2-messaging in the C-RAN, in accordance with an exemplary embodiment of the present disclosure.

Referring now to FIG. 6, is a flow diagram illustrating steps performed at a C-RAN to manage X2-messaging (i.e., X2-interface messaging) between the virtual eNBs for load management. As illustrated in the flowchart, at step 602, a request from the first virtual eNB may be received, by the control unit, to perform the load management with one of a set of neighbor eNBs associated with the first virtual eNB. At step 604, information associated with user equipment (UE) capacity and Radio Resource Control (RRC) connections of the first virtual eNB and the set of neighbor eNBs may be obtained by the control unit. At step 606, the second virtual eNB may be selected, by the control unit, from the set of neighbor eNBs by analyzing the UE capacity and the RRC connections of each virtual eNB based on a predefined criteria. At step 608, a decision to exchange overload and traffic load information between the source eNB and the target eNB associated with the second virtual eNB may be determined, by the control unit.

Additional illustrative embodiments are listed below. In one embodiment, a non-transitory computer-readable medium storing computer-executable instructions for X2-messaging in C-RAN is disclosed. In one example, the stored instructions, when executed by a processor, may cause the processor to perform operations such as receiving, by a control unit in the C-RAN, a request from a first virtual eNodeB (eNB) associated with a source eNodeB (eNB) to establish a X2 interface with each virtual eNB associated with a set of neighbor eNBs. The operations may further include selecting, by the control unit, a second virtual eNB associated with a target eNB from the virtual eNBs associated with the set of neighbor eNBs. The operations may further include determining, by the control unit, whether the first virtual eNB associated with the source eNB and the second virtual eNB associated with the target eNB are co-located on a datacenter in the C-RAN. The operations may further include transmitting, by the control unit, at least one X2 message between the first virtual eNB and the second virtual eNB when the first virtual eNB and the second virtual eNB are co-located on the datacenter. The operations may further include instructing at least one of the source eNB or the target eNB to perform at least one X2 interface function based on the at least one X2 message transmitted between the first virtual eNB and the second virtual eNB.

Figure 7:
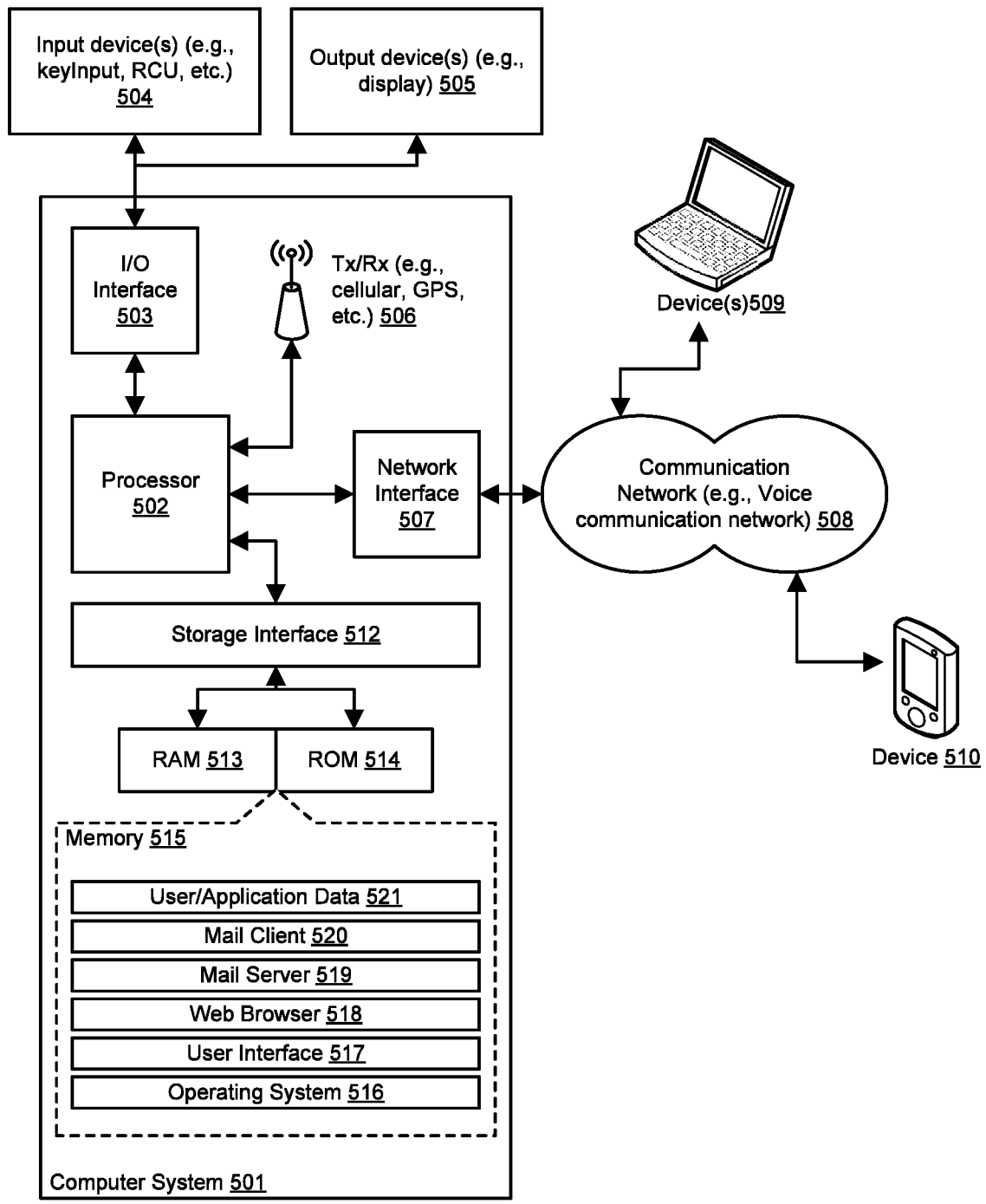
FIG. 7 is a block diagram of an exemplary computer system for implementing embodiments consistent with the present disclosure.

FIG. 7 is a block diagram of an exemplary computer system for implementing embodiments consistent with the present disclosure. Variations of computer system 701 may be a C-RAN. Computer system 701 may comprise a central processing unit ("CPU" or "processor") 702. Processor 702 may comprise at least one data processor for executing program components for executing user- or system-generated requests. A user may include a person, a person using a device such as such as those included in this disclosure, or such a device itself. The processor may include specialized processing units such as integrated system (bus) controllers, control unit 102, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be (infrared) remote control, key-inputs, keyboard, microphone, touch screen, touchpad, sensor (e.g., accelerometer, light sensor, GPS, gyroscope, proximity sensor, or the like), visors, etc. Output device 705 may be a video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, GSM network and other similar network that provide voice communication such as a direct interconnection, local area network (LAN), wide area network (WAN), wireless network (e.g., using Wireless Application Protocol), the Internet, etc. Using the network interface 707 and the communication network 708, the computer system 701 may communicate with devices 709 and 710. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 702 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc.

The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., voice message/recommended message associated with the TV program, user-interaction-data associated with the TV program, and STB-directed commends associated with the TV program) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described X2 interfacing in the C-RAN. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of X2-messaging in a Cloud Radio Access Network (C-RAN), the method comprising:
   receiving, by a control unit in the C-RAN, a request from a first virtual eNodeB (eNB) associated with a source eNodeB (eNB) to establish a X2 interface with each virtual eNB associated with a set of neighbor eNBs;
   selecting, by the control unit, a second virtual eNB associated with a target eNB from the virtual eNBs associated with the set of neighbor eNBs;
   determining, by the control unit, whether the first virtual eNB associated with the source eNB and the second virtual eNB associated with the target eNB are co-located and/or running on same datacenter in the C-RAN;
   transmitting, by the control unit, at least one X2 message between the first virtual eNB and the second virtual eNB based on eNB information accessed from a shared storage when the first virtual eNB and the second virtual eNB are co-located on the datacenter; and
   performing at least one X2 interface function on at least one of the source eNB or the target eNB based on the at least one X2 message transmitted between the first virtual eNB and the second virtual eNB.

2. The method of claim 1, wherein the at least one X2 interface function comprises at least one of handover coordination or load management between the source eNB and the target eNB.

3. The method of claim 2, wherein selecting the second virtual eNB associated with the target eNB from the virtual eNBs associated with the set of neighbor eNBs, comprises:
   receiving, by the control unit, a request from the first virtual eNB to perform the handover coordination with one of the set of neighbor eNBs associated with the first virtual eNB;
   obtaining, by the control unit, information associated with user equipment (UE) capacity and Radio Resource Control (RRC) connections of the first virtual eNB and each virtual eNB associated with the set of neighbor eNBs; and
   selecting, by the control unit, the second virtual eNB associated with the target eNB from the set of neighbor eNBs by analyzing the UE capacity and the RRC connections of each virtual eNB based on a predefined criteria.

4. The method of claim 3, further comprising:
   determining, by the control unit, a decision to establish at least one RRC connection from the target eNB associated with the second virtual eNB to the UE;
   retrieving, by the control unit, configuration setting associated with the at least one RRC connection to be established from the target eNB to the UE; and
   instructing the source eNB to share the configuration setting associated with the at least one RRC connection to the UE.

5. The method of claim 4, further comprising:
   updating, in a shared storage, a new RRC connection established from the target eNB to the UE; and
   automatically updating a set of neighboring eNBs of the target eNB and configuration settings associated with the set of neighboring eNBs list to perform a subsequent handover coordination.

6. The method of claim 2, wherein performing the load management based on the at least one X2 message transmitted between the first virtual eNB and the second virtual eNB, comprises:
   receiving, by the control unit, a request from the first virtual eNB to perform the load management with one of a set of neighbor eNBs associated with the first virtual eNB;
   obtaining by the control unit, information associated with user equipment (UE) capacity and Radio Resource Control (RRC) connections of the first virtual eNB and the set of neighbor eNBs;
   selecting, by the control unit, the second virtual eNB from the set of neighbor eNBs by analyzing the UE capacity and the RRC connections of each virtual eNB based on a predefined criteria; and
   determining, by the control unit, a decision to exchange overload and traffic load information between the source eNB and the target eNB associated with the second virtual eNB.

7. The method of claim 1, wherein the at least one X2 message comprises X2 Application Protocol (X2-AP) messages and General Packet Radio Service (GPRS) Tunneling Protocol (GTP) messages.

8. The method of claim 7, wherein the X2-AP messages are transmitted between the first virtual eNB and the second virtual eNB to perform load management and handover coordination at the source eNB and the target eNB.

9. The method of claim 7, wherein the GTP messages are transmitted from the first virtual eNB to the second virtual eNB to forward UE downlink data buffered at the source eNB to the target eNB.

10. The method of claim 1, wherein transmitting, by the control unit, at least one X2 message between the first virtual eNB and the second virtual eNB through inter-process communication.

11. The method of claim 1, wherein the inter-process communication is performed by one of named-pipe, memory-mapped file, message queue, and a shared storage in the C-RAN.

12. A Cloud Radio Access Network (C-RAN) comprising:
a plurality of virtual eNodeBs; and
a control unit communicatively connected to each virtual eNodeB, wherein the control unit is to:
receive a request from a first virtual eNB associated with a source eNodeB (eNB) to establish a X2 interface with each virtual eNB associated with a set of neighbor eNBs;
select a second virtual eNB associated with a target eNB from the virtual eNBs associated with the set of neighbor eNBs;
determine whether a first virtual eNB associated with the source eNB and a second virtual eNB associated with the target eNB are co-located and/or running on same datacenter in the C-RAN;
transmit at least one X2 message between the first virtual eNB and the second virtual eNB based on eNB information accessed from a shared storage when the first virtual eNB and the second virtual eNB are co-located on the datacenter; and
perform at least one X2 interface function on at least one of the source eNB or the target eNB based on the at least one X2 message transmitted between the first virtual eNB and the second virtual eNB.

13. The C-RAN of claim 12, wherein the at least one X2 interface function comprises at least one of handover coordination or load management between the source eNB and the target eNB.

14. The C-RAN of claim 12, wherein the control unit selects the second virtual eNB associated with a target eNB from the virtual eNBs associated with the set of neighbor eNBs by:
obtaining information associated with user equipment (UE) capacity and Radio Resource Control (RRC) connections of the first virtual eNB associated with the source eNB and each virtual eNB associated with the set of neighbor eNBs;
analyzing the UE capacity and the RRC connections of each virtual eNB associated with the set of neighbor eNBs based on a predefined criteria; and
selecting the second virtual eNB associated with the target eNB by analysis.

15. The C-RAN of claim 14, wherein the X2-AP messages are transmitted between the first virtual eNB and the second virtual eNB to perform load management and handover coordination at the source eNB and the target eNB.

16. The C-RAN of claim 14, wherein the GTP messages are transmitted from the first virtual eNB to the second virtual eNB to forward UE downlink data buffered at the source eNB to the target eNB.

17. The C-RAN of claim 12, wherein the at least one X2 message comprises X2 Application Protocol (X2-AP) messages and General Packet Radio Service (GPRS) Tunneling Protocol (GTP) messages.

18. The C-RAN of claim 12, wherein transmitting, by the control unit, at least one X2 message between the first virtual eNB and the second virtual eNB through inter-process communication.

19. The C-RAN of claim 12, wherein the inter-process communication is performed by one of named-pipe, memory-mapped file, message queue, and a shared storage in the C-RAN.

20. A non-transitory computer-readable storage medium having stored thereon, a set of computer-executable instructions causing a cloud radio access network (C-RAN) comprising one or more processors to:
receive, by a control unit in the C-RAN, a request from a first virtual eNodeB (eNB) associated with a source eNodeB (eNB) to establish a X2 interface with each virtual eNB associated with a set of neighbor eNBs;
select, by the control unit, a second virtual eNB associated with a target eNB from the virtual eNBs associated with the set of neighbor eNBs;
determine, by the control unit, whether the first virtual eNB associated with the source eNB and the second virtual eNB associated with the target eNB are co-located and/or running on same datacenter in the C-RAN;
transmit, by the control unit, at least one X2 message between the first virtual eNB and the second virtual eNB based on eNB information accessed from a shared storage when the first virtual eNB and the second virtual eNB are co-located on the datacenter; and
perform at least one X2 interface function on at least one of the source eNB or the target eNB based on the at least one X2 message transmitted between the first virtual eNB and the second virtual eNB.

\* \* \* \* \*